United States Patent
Shibata

(10) Patent No.: US 6,460,607 B1
(45) Date of Patent: Oct. 8, 2002

(54) VEHICLE AIR CONDITIONER

(75) Inventor: Kazuji Shibata, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/467,804

(22) Filed: Dec. 20, 1999

(30) Foreign Application Priority Data

Dec. 25, 1998 (JP) .......................... 10-369090
Oct. 5, 1999 (JP) .......................... 11-284746

(51) Int. Cl.⁷ .......................... F25B 29/00; B60H 1/32
(52) U.S. Cl. .......................... 165/42; 165/43; 454/121; 454/156; 454/160; 454/161; 237/12.3 A; 237/12.3 B
(58) Field of Search .......................... 165/201, 42, 43; 454/121, 156, 160, 161; 237/12.3 A, 12.3 B

(56) References Cited

U.S. PATENT DOCUMENTS

| | | | | |
|---|---|---|---|---|
| 3,948,312 A | * | 4/1976 | Nisbet | 238/12.3 B |
| 5,711,369 A | * | 1/1998 | Ito et al. | 237/12.3 V |
| 5,755,107 A | | 5/1998 | Shirota et al. | |
| 5,836,380 A | * | 11/1998 | Takeshita | 237/12.3 B |
| 5,884,689 A | * | 3/1999 | Takechi et al. | 165/43 |

FOREIGN PATENT DOCUMENTS

| | | | | |
|---|---|---|---|---|
| EP | 0 691 228 A1 | 1/1996 | | |
| GB | 2299855 | 10/1996 | | |
| JP | 61-122022 | * 6/1986 | ............ | 237/12.3 A |
| JP | A 9-11730 | 1/1997 | | |
| JP | A 10-114209 | 5/1998 | | |
| JP | A 10-297248 | 11/1998 | | |

* cited by examiner

Primary Examiner—John K. Ford
(74) Attorney, Agent, or Firm—Harness, Dickey & Pierce, PLC

(57) ABSTRACT

A vehicle air conditioner has a case and a heater core disposed in the case substantially horizontally. The case has a center face opening formed in a side wall of the case at a substantially same height as the heater core, a defroster opening and a foot outlet. A warm air guide is disposed above the heater core to guide warm air passing through the heater core. Warm air guided by the warm air guide is mixed with cool air bypassing the heater core, and flows toward the defroster opening through an air port formed by an end portion of the warm air guide at a substantially same height as the warm air guide. Therefore, an opening area of the air port is simply increased by reducing a length of the warm air guide without increasing a size of the vehicle air conditioner. As a result, a sufficient amount of air is introduced into the defroster opening.

16 Claims, 3 Drawing Sheets

VEHICLE AIR CONDITIONER

CROSS REFERENCE TO RELATED APPLICATIONS

This application relates to and claims priority from Japanese Patent Application Nos. 10-369090 filed on Dec. 25, 1998 and 11-284746 filed on Oct. 5, 1999, the contents of which are hereby incorporated by reference.

BACKGROUND OF THE INVENTION

1. Field of the Invention

The present invention relates generally to a vehicle air conditioner, and particularly to an air passage of an air conditioning unit in which a heater core is disposed in a substantially horizontal direction.

2. Related Art

JP-A-9-123748 discloses a vehicle air conditioner in which a heater core is disposed in a substantially horizontal direction. As shown in FIG. 4, the air conditioning unit has a case 50 and a warm air guide 110 for guiding warm air heated by a heater core 100 to a downstream air side. The case 50 has a face opening 120, a defroster opening 130 and a foot opening 140 provided above the warm air guide 110. Each of the openings 120, 130 and 140 communicates with an air outlet formed in a passenger compartment of a vehicle, and is selectively opened and closed by a face door 150 and a defroster door 160. When the face door 150 fully opens the face opening 120, an air port 170 through which air flows toward the defroster opening 130 and the foot opening 140 is closed. When the face door 150 fully opens the air port 170, the face opening 120 is closed.

The air port 170 is disposed at an upstream air side of the defroster opening 130 and the foot opening 140. Therefore, when a defroster air mode or the like is selected, air is introduced into the defroster opening 130 through the air port 170. However, since the air port 170 is opened and closed by the face door 150, a sealing wall portion 180 needs to be formed to extend from the warm air guide 110 to the case 50, so that a peripheral portion of the face door 150 contacts the sealing wall portion 180 for sealing when the face door 150 closes the air port 170. Therefore, an opening area of the air port 170 is decreased due to the sealing wall portion 180. As a result, an amount of air flowing into the defroster opening 130 is decreased, and a windshield of the vehicle may be fogged.

Further, as shown in FIG. 5A, when the face opening 120 has a center face opening 120a and a side face opening 120b, and the side face opening 12b is constantly open so that side windows of the vehicle are sufficiently defrosted, the face door 150 only opens and closes the center face opening 120a. Therefore, a width of the face door 150 (i.e., a length of the face door 150 in a right-left direction in FIG. 5A) is decreased from that of the face door 150 which opens and closes both the center face opening 120a and the side face opening 120b. As a result, as shown in FIG. 5B, a width of the air port 170 is decreased corresponding to the width of the face door 150, thereby further decreasing an opening area of the air port 170. As a result, an amount of air introduced into the defroster opening 130 is further decreased.

The opening area of the air port 170 may be simply increased by increasing the width of the air port 170 or a height of the air port 170 (i.e., a length of the air port 170 in a vertical direction in FIG. 5B). However, when the width of the air port 170 is increased, a width of the vehicle air conditioner is increased. When the height of the air port 170 is increased by enlarging the air port 170 upwardly, a height of the vehicle air conditioner is increased. When the height of the air port 170 is increased by enlarging the air port 170 downwardly, the warm air guide 110 may need to be moved downwardly. When the warm air guide 110 is moved downwardly, a warm air passage 190 formed between the warm air guide 110 and the heater core 100 is narrowed, thereby increasing flow resistance in the warm air passage 190. As a result, an amount of warm air flowing through the warm air passage 190 is decreased, and an amount of air introduced into the defroster opening 130 is decreased.

SUMMARY OF THE INVENTION

In view of the foregoing problems, it is an object of the present invention to provide a vehicle air conditioner which has a sufficient amount of air blown from a defroster air outlet without increasing a size of an air conditioning unit.

According to the present invention, a vehicle air conditioner has a case for forming an air passage, a heating heat exchanger disposed in the case in a substantially horizontal direction for heating air, a warm air guide disposed above the heating heat exchanger for guiding air heated by the heating heat exchanger and a switching door. The case has a first air opening and a second air opening through which air flows in different directions. The air passage includes an air port disposed at an upstream air side of the second air opening. Warm air passing through the heating heat exchanger is guided by the warm air guide into an air mixing space in which the warm air is mixed with cool air bypassing the heating heat exchanger. The air mixing space is formed next to the heating heat exchanger in a vehicle front-rear direction in the air passage. The warm air guide is disposed at a substantially same height as the air port, and has an end portion for defining the air port. The switching door selectively opens and closes the first air opening and the air port, and has an end portion which contacts the end portion of the warm air guide to close the air port.

As a result, an opening area of the air port is readily increased by decreasing a length of the warm air guide in the vehicle front-rear direction, and a sealing wall portion extending from the warm air guide to the case to contact the switching door is not required. Therefore, an amount of air flowing through the air port is increased without increasing a size of the air conditioner, and an amount of air flowing into the second air opening is increased.

BRIEF DESCRIPTION OF THE DRAWINGS

This and other objects and features of the present invention will become more readily apparent from a better understanding of the preferred embodiments described below with reference to the accompanying drawings, in which.

DETAILED DESCRIPTION OF THE PREFERRED EMBODIMENTS

Preferred embodiments of the present invention are described hereinafter with reference to the accompanying drawings.

A first preferred embodiment of the present invention will be described with reference to FIGS. 1 and 2.

Figure 1:
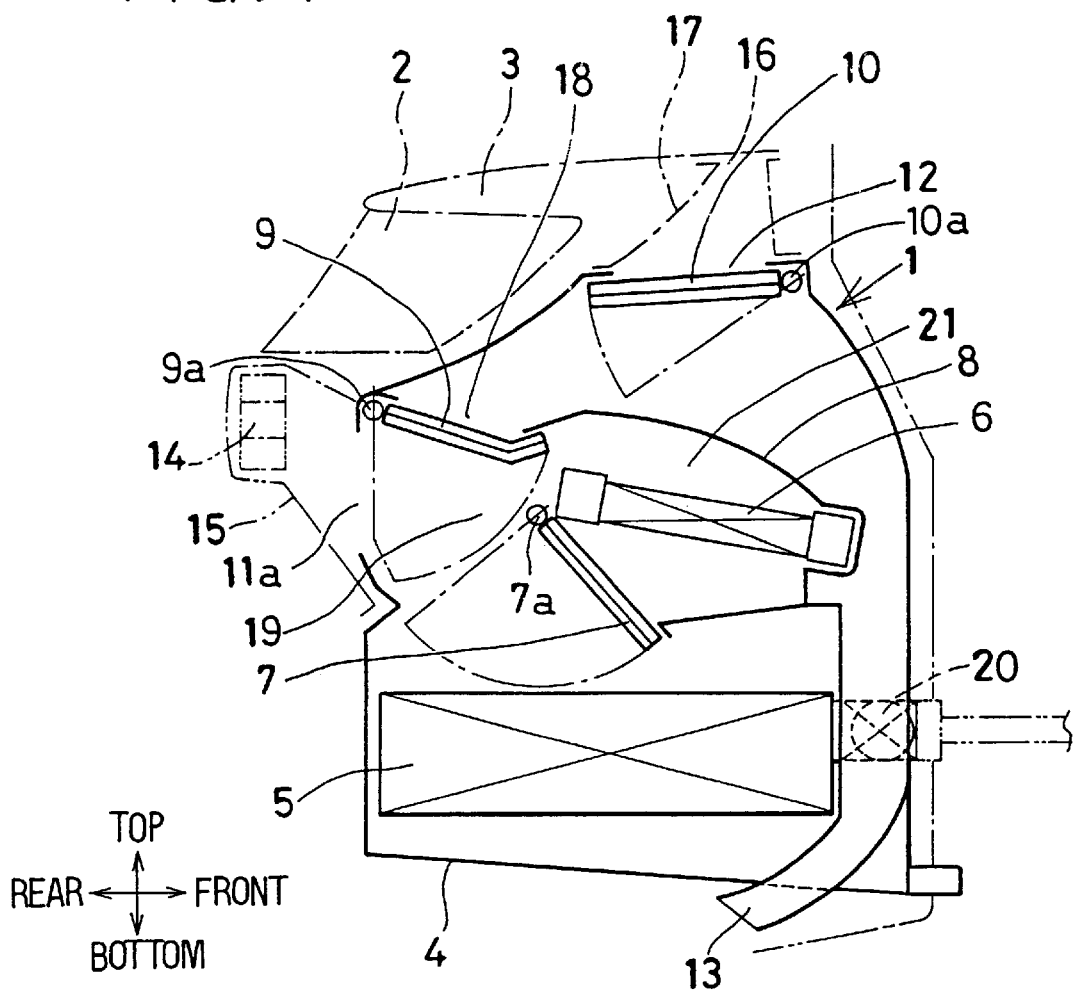
FIG. 1 is a schematic sectional view showing an air conditioning unit according to a first preferred embodiment of the present invention.
Figure 2:
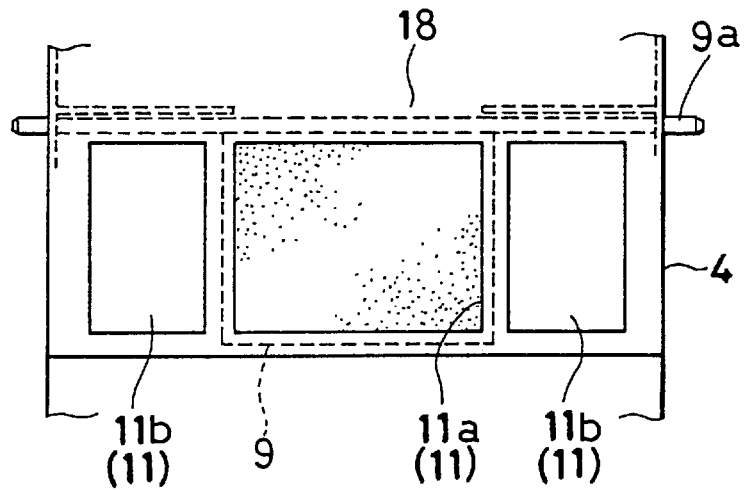
FIG. 2 is a front view showing a face opening of the air conditioning unit according to the first embodiment.

As shown in FIG. 1, an air conditioning unit 1 of a vehicle air conditioner according to the first embodiment is disposed below an instrumental panel 3 having a meter 2, at a substantially center of the panel 3 in a vehicle width direction. The air conditioning unit 1 includes a case 4 connected to a blower unit (not shown), a cooling heat exchanger 5, a heater core 6, an air mixing door 7, a warm air guide 8, a face door 9 and a defroster door 10. The case 4 is made of resin such as polypropylene, and forms an air passage through which air blown by the blower unit flows into a passenger compartment of a vehicle.

The case 4 has a first air opening in the form of a face opening 11, a second air opening in the form of a defroster opening 12 and a foot outlet 13. The face opening 11 is formed in a side wall of the case 4 (i.e., left wall in FIG. 1) at a front side of the passenger compartment. As shown in FIG. 2, the face opening 11 includes a center face opening 11a and a side face opening 11b disposed on each side of the center face opening 11a. The center face opening 11a communicates with a well-known center face outlet 14 through a duct 15. Air is blown from the center face outlet 14 mainly toward an upper body of a passenger. The side face opening 11b communicates with a well-known side face outlet (not shown) formed at vehicle right and left sides in the passenger compartment through a duct (not shown). The defroster opening 12 is formed in a top wall of the case 4 and communicates with a well-known defroster outlet 16 through a duct 17. Air is blown from the defroster outlet 16 toward a windshield of the vehicle. The foot outlet 13 is formed into a duct like, and extends from a lower portion of the case 4 to be opened toward a foot portion of the passenger.

Air in the case 4 flows from an introduction passage into the defroster opening 12 and the foot outlet 13 through an air port 18. The air port 18 is disposed above the center face opening 11a and is open in a substantially horizontal direction. An opening area and an opening shape of the air port 18 are substantially equal to those of the center face opening 11a. Further, warm air heated by the heater core 6 is mixed with cool air having bypassed the heater core 6 in an air mixing space 19 formed next to the heater core 6 in a vehicle front-rear direction in the case 4.

In the first embodiment, the cooling heat exchanger 5 is an evaporator of a refrigeration cycle. Low-temperature low-pressure refrigerant decompressed by an expansion valve 20 is introduced into the cooling heat exchanger 5, and is heat-exchanged with air blown by the blower unit and passing through the cooling heat exchanger 5 so that air is cooled. The cooling heat exchanger 5 is disposed in the lower portion of the case 4 in a substantially horizontal direction so that air blown by the blower unit passes through the cooling heat exchanger 5 upwardly.

Engine coolant (hot water) flows through the heater core 6, and is heat-exchanged with air passing through the heater core 6 so that air is heated. The heater core 6 is disposed above the cooling heat exchanger 5 substantially horizontally, so that air having passed through the cooling heat exchanger 5 passes through the heater core 6 upwardly. The face opening 11 is disposed at a substantially same height as the heater core 6, and the defroster opening 12 is disposed above the heater core 6.

The air mixing door 7 is a plate door rotatably held by a rotation shaft 7a, and adjusts a ratio of an amount of air passing through the heater core 6 and an amount of air bypassing the heater core 6. The air mixing door 7 is rotated between a maximum cooling position indicated by a solid line in FIG. 1 and a maximum heating position indicated by a chain line in FIG. 1. The warm air guide 8 is disposed to cover the heater core 6 from above to guide warm air heated by the heater core 6 into the air mixing space 19. The warm air guide 8 and the heater core 6 define a warm air passage 21 therebetween. The air port 18 is formed by an end portion (i.e., left end portion in FIG. 1) of the warm air guide 8.

The face door 9 and the defroster door 10 are used for switching air outlet modes. The face door 9 is a plate door rotatably held by a rotation shaft 9a, and is used to switch between a face air mode and other air modes such as a defroster air mode and a foot air mode. The face door 9 opens the center face opening 11a and closes the air port 18 in the face air mode, and closes the center face opening 11a and opens the air port 18 in the other air modes. In the first embodiment, as shown in FIG. 2, the face door 9 opens and closes only the center face opening 11a, and the side face opening 11b is constantly open regardless of the air outlet mode. The defroster door 10 is a plate door rotatably held by a rotation shaft 10a, and is used to switch between the defroster air mode and the foot air mode. The defroster door 10 opens the defroster opening 12 and closes a passage toward the foot outlet 13 in the defroster air mode, and closes the defroster opening 12 and opens the passage toward the foot outlet 13 in the foot air mode.

Next, operation of the air conditioning unit 1 according to the first embodiment will be described.

Air blown by the blower unit into the case 4 is cooled while passing through the cooling heat exchanger 5. A ratio of an amount of cool air passing through the heater core 6 and an amount of cool air bypassing the heater core 6 is controlled by adjusting an opening degree of the air mixing door 7. Warm air heated by the heater core 6 is guided by the warm air guide 8 into the air mixing space 19, and is mixed with cool air bypassing the heater core 6 therein to have a predetermined temperature. Conditioned air having the predetermined temperature is blown into the passenger compartment through any one of the face opening 11, the defroster opening 12 and foot outlet 13 opened according to the selected air outlet mode. In a maximum cooling mode, the air mixing door 7 is set to the maximum cooling position so that entire cool air from the cooling heat exchanger 5 bypasses the heater core 6. In the maximum heating mode, the air mixing door 7 is set to the maximum heating position so that entire cool air from the cooling heat exchanger 5 passes through the heater core 6.

According to the first embodiment, the face opening 11 is formed in the side wall of the case 4 at the substantially same height as the heater core 6, and the air port 18 is disposed at the substantially same height as the warm air guide 8 to be formed by the end portion of the warm air guide 8. That is, the warm air guide 8 substantially extends on a surface, and the air opening 18 is provided on the surface. Therefore, the opening area of the air port 18 is readily increased by reducing a length of the warm air guide 8 in a vehicle front-rear direction. Further, the air port 18 is closed when an end portion of the face door 9 contacts the end portion of the warm air guide 8. Therefore, a sealing wall portion extending from the warm air guide 8 to the case 4 is not needed, and the opening area of the air port 18 is not decreased by the sealing wall portion. Thus, the opening area of the air port 18 is increased without increasing a size of the air conditioning unit 1. Further, since the warm air guide 8 does not need to be moved downwardly to increase the opening area of the air port 18, the warm air passage 21 is not narrowed. As a result, in the defroster mode, a sufficient amount of air is introduced into the defroster opening 12 through the air port 18.

Further, in the first embodiment, since the face opening 11 is disposed below the defroster opening 12, a height of the case 4 at a vehicle-rear side of the defroster opening 12 is reduced. As a result, mounting of the air conditioning unit 1 to the vehicle, especially to a vehicle with a small height, is facilitated. Furthermore, since the height of the case 4 at the vehicle-rear side of the defroster opening 12 is reduced, a space is created above the case 4 in the passenger compartment. Therefore, even when the meter 2 is disposed at a substantially center of the instrumental panel 3 in the vehicle width direction, the air conditioning unit 1, which is also disposed at the substantially center of the panel 3 in the vehicle width direction, is mounted to the vehicle without interfering with the meter 2.

Also in the first embodiment, as shown in FIG. 1, since the air port 18 is open substantially horizontally, when the air port 18 is closed by the face door 9, the face door 9 is disposed substantially in line with the warm air guide 8. Further, the center face opening 11a is formed in the side wall of the case 4. Therefore, in the maximum cooling mode, the air mixing door 7 is disposed substantially in line with the face door 9, and cool air from the cooling heat exchanger 5 is guided by the air mixing door 7 and the face door 9 to smoothly flow into the center face opening 11a, while being restricted from flowing into the warm air passage 21. Therefore, even when the heater core 6 does not have a hot water valve and hot water constantly flows through the heater core 6, cool air bypassing the heater core 6 is restricted from being heated by the heater core 6. As a result, a temperature of air blown into the passenger compartment is restricted from rising in the maximum cooling mode.

Further, in the first embodiment, the center face opening 11a is formed in the side wall of the case 4 at a most front side of the passenger compartment. Therefore, the center face opening 11a is formed more adjacently to the center face outlet 14. As a result, pressure loss of air flowing through the duct 15 is decreased.

A second preferred embodiment of the present invention will be described with reference to FIG. 3. In this embodiment, components which are substantially the same as those in the previous embodiment are assigned the same reference numerals, and the explanation thereof is omitted.

Figure 3:
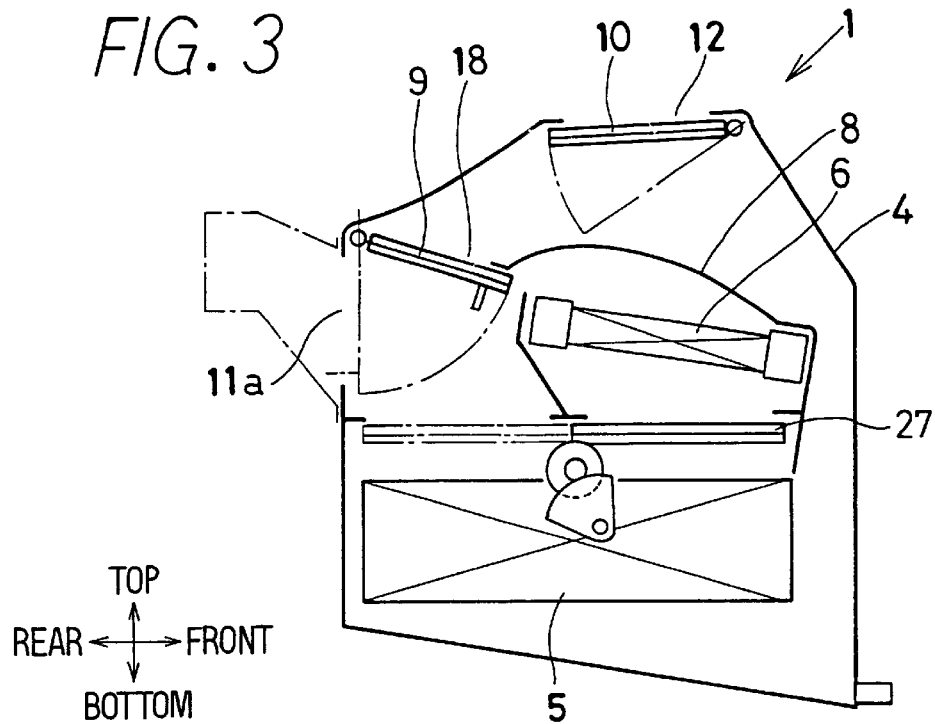
FIG. 3 is a schematic sectional view showing an air conditioning unit according to a second preferred embodiment of the present invention.
Figure 4:
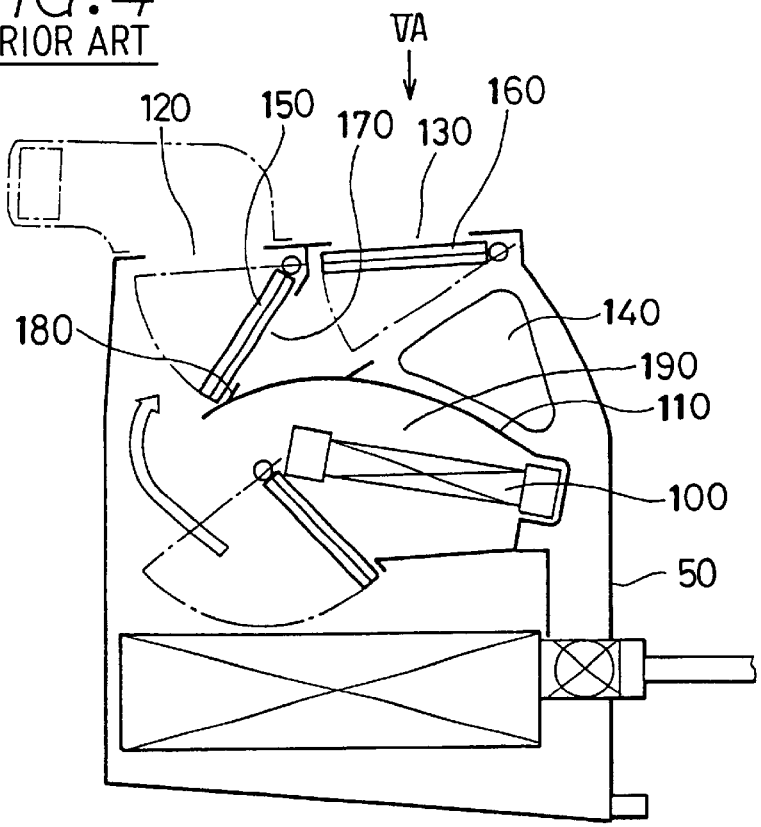
FIG. 4 is a schematic sectional view showing a conventional air conditioning unit.
Figure 5A:
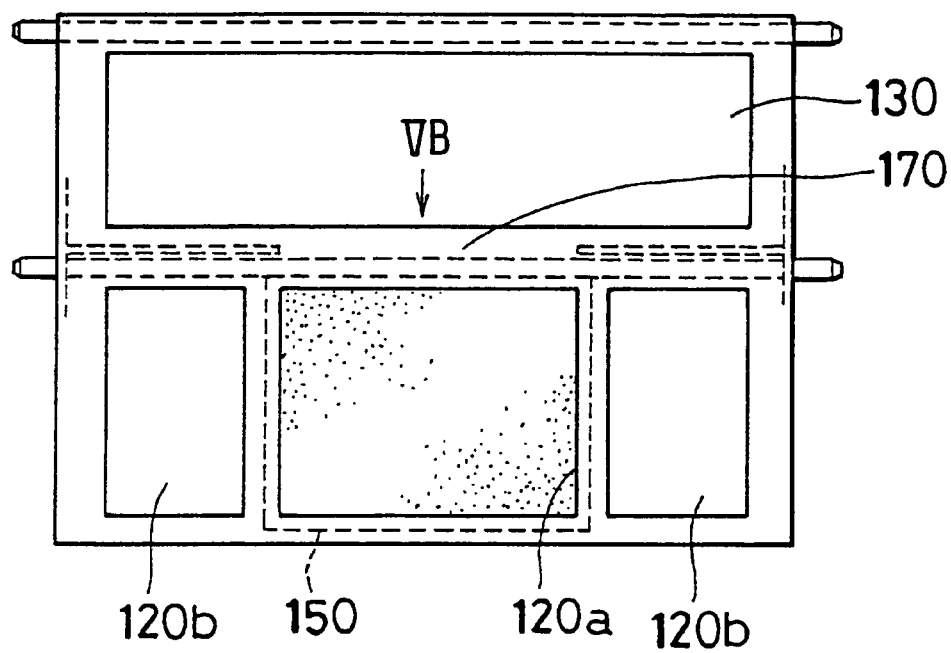
FIG. 5A is a top view taken from arrow VA in FIG. 4.
Figure 5B:
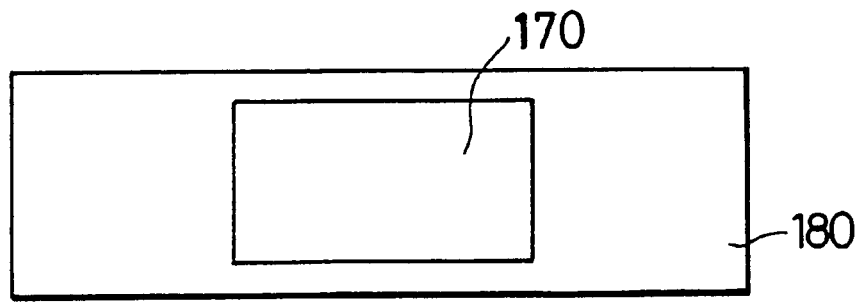
FIG. 5B is a top view taken from arrow VB in FIG. 5A.

As shown in FIG. 3, the air conditioning unit 1 according to the second embodiment has a sliding air mixing door 27. The sliding air mixing door 27 is disposed at a downstream air side of the cooling heat exchanger 5, and is slidably moved in parallel with an upper surface of the cooling heat exchanger 5 to adjust a ratio of an amount of air passing through the heater core 6 and an amount of air bypassing the heater core 6.

According to the second embodiment, the sliding air mixing door 27 is slidably moved in a front-rear direction of the vehicle (a right-left direction in FIG. 3), and is not moved in a vertical direction of the vehicle. Therefore, a space required for the sliding air mixing door 27 in the case 4 is greatly reduced in the vertical direction. As a result, the height of the air conditioning unit 1 is further reduced, and mounting of the air conditioning unit 1 to the vehicle is more facilitated.

In the above-mentioned first and second embodiments, the side face opening 11b may be opened and closed by the face door 9.

Although the present invention has been fully described in connection with preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. An air conditioner in combination with a vehicle comprising:

a case for forming an air passage through which air flows, the case including a first air opening through which air is blown toward a center upper side of a passenger compartment and a second air opening through which air flows toward a windshield of the vehicle, the air passage including an air port through which air is introduced into the second air opening;

a heating heat exchanger disposed at a vehicle front side in the case in a substantially horizontal direction for heating air upwardly passing through the heating heat exchanger from below to form a bypass passage within the case at a vehicle rear side of the heating heat exchanger through which air bypasses the heating heat exchanger;

a warm air guide disposed above the heating heat exchanger for guiding warm air heated by the heating heat exchanger into an air mixing space in which warm air passing through the heating heat exchanger is mixed with cool air passing through the bypass passage, the air mixing space being formed at a vehicle rear side of the heating heat exchanger next to the heating heat exchanger in the air passage; and a switching door for selectively opening the first air opening while closing the air port and closing the first air opening while opening the air port, wherein:

the warm air guide has an end portion for defining the air port, and extends approximately horizontally;

the air port is provided substantially horizontally;

a direct passage from the air port to the second air opening extends obliquely toward a front upper side of the vehicle;

the first air opening is substantially vertically disposed in a rear side wall of said case and is provided at a vehicle rear side position of the air mixing space;

the air port is provided at an upper side position of the air mixing space;

the second air opening is provided on an approximately upper side at an upper side position of the warm air guide; and the switching door has an end portion which contacts the end portion of the warm air guide and is positioned approximately horizontally when the switching door closes the air port.

2. The combination according to claim 1, wherein the heating heat exchanger is disposed at a substantially same height as the first air opening.

3. The combination according to claim 1, further comprising a cooling heat exchanger disposed below the heating heat exchanger in a substantially horizontal direction for cooling air in the case.

4. The combination according to claim 3, further comprising an air mixing door disposed above the cooling heat exchanger for adjusting a ratio of an amount of air passing through the heating heat exchanger and an amount of air bypassing the heating heat exchanger.

5. The combination according to claim 4, wherein the air mixing door is slidably moved in parallel with the cooling heat exchanger.

6. The combination according to claim 1, wherein a height of the case at a rear side of the second opening in the vehicle front-rear direction is smaller than a height of the case at a front side of the second opening in the vehicle front-rear direction.

7. The combination according to claim 1, wherein the case includes a side face opening constantly open and communicating with a side face outlet through which air is blown toward side windows of the vehicle.

8. The combination according to claim 1, wherein:
   the case includes a side face opening communicating with a side face outlet through which air is blown toward side windows of the vehicle; and
   the first air opening includes the side face opening.

9. The combination according to claim 1, wherein a portion of the periphery of the air port is defined by a portion of the periphery of the warm air guide.

10. The combination according to claim 4, wherein:
    the air mixing door is rotatably held in the vicinity of the heating heat exchanger; and
    the air mixing door is disposed substantially in line with the switching door when the air mixing door is disposed to cause entire cool air cooled by the cooling heating exchanger to bypass the heating heat exchanger and the switching door fully closes the air port.

11. The combination according to claim 1, wherein the heating heat exchanger includes a heater core.

12. The combination according to claim 1, wherein the air port and the second air opening are provided in such a manner that air from the air port is introduced into the second air opening through said direct air passage, extending from the air port toward a vehicle front upper side.

13. The combination according to claim 1, wherein the second air opening is provided at an approximate direct upper side of the heating heat exchanger.

14. The combination according to claim 1, wherein:
    the case has a case part defining the direct passage; and
    the case part is provided to a form a space between the case part and an instrument panel of the vehicle, positioned upper than the case part, such that a meter unit of the vehicle is provided in the space.

15. The combination according to claim 1, wherein the switching door is disposed to switch a communication between the air mixing space and the first air opening, and a communication between the air mixing space and the air port.

16. The combination according to claim 1, wherein:
    the case further has a third air opening communicating with a foot air outlet through a foot air passage, from which air is blown toward a lower side of the passenger compartment;
    the second air opening and the third air opening are provided such that air from the air port is branched into an air flow toward the second air opening and an air flow toward the third air opening; and
    the foot air passage extends downwardly from the third air opening to the foot air outlet, at a front side of the heating heat exchanger.

* * * * *